United States Patent [19]

Stephens et al.

[11] Patent Number: 6,077,927

[45] Date of Patent: *Jun. 20, 2000

[54] PROCESS FOR COLORING POLYMER RESINS AND PRODUCTS THEREOF

[75] Inventors: Eric B. Stephens, Roebuck; Mark E. Ragsdale, Duncan; David J. Moody, Spartanburg, all of S.C.

[73] Assignee: Milliken & Company, Spartanburg, S.C.

[ * ] Notice: This patent is subject to a terminal disclaimer.

[21] Appl. No.: 09/177,405

[22] Filed: Oct. 23, 1998

Related U.S. Application Data

[63] Continuation of application No. 08/733,862, Oct. 18, 1996, Pat. No. 5,864,002.

[51] Int. Cl.$^7$ .................................................. C08G 18/50
[52] U.S. Cl. .......................... 528/77; 521/115; 521/116; 521/118; 521/121; 521/128; 521/129; 521/164; 521/167; 521/174; 521/177; 528/78; 528/79
[58] Field of Search ...................... 521/115, 116, 521/118, 121, 128, 129, 164, 167, 174, 177; 528/77, 78, 79

[56] References Cited

U.S. PATENT DOCUMENTS

| | | | |
|---|---|---|---|
| 3,994,835 | 11/1976 | Wolf et al. ............................... | 521/107 |
| 4,113,721 | 9/1978 | Hauser et al. ........................... | 534/729 |
| 4,284,729 | 8/1981 | Cross et al. .............................. | 521/158 |
| 4,507,407 | 3/1985 | Kluger et al. ............................ | 521/113 |
| 4,751,254 | 6/1988 | Kluger et al. ............................ | 521/163 |
| 4,761,502 | 8/1988 | Kluger et al. ............................ | 564/442 |
| 4,775,748 | 10/1988 | Kluger et al. ............................ | 534/729 |
| 4,846,846 | 7/1989 | Rekers et al. ............................... | 8/515 |
| 4,871,371 | 10/1989 | Harris ......................................... | 8/403 |
| 4,912,203 | 3/1990 | Kluger et al. ............................ | 534/729 |
| 5,082,938 | 1/1992 | Kluger et al. ............................. | 544/38 |
| 5,108,460 | 4/1992 | Hines et al. ................................ | 8/403 |
| 5,231,135 | 7/1993 | Machell et al. ......................... | 525/123 |
| 5,290,921 | 3/1994 | Moody et al. .......................... | 534/607 |
| 5,530,104 | 6/1996 | Tzikas et al. ............................ | 534/642 |
| 5,554,731 | 9/1996 | Herd et al. .............................. | 534/593 |
| 5,591,833 | 1/1997 | Hines et al. ............................. | 534/607 |

FOREIGN PATENT DOCUMENTS 0 648 792 A1   4/1995   European Pat. Off. .

*Primary Examiner*—Rabon Sergent
*Attorney, Agent, or Firm*—Terry T. Moyer; Timothy J. Monahan

[57] ABSTRACT

A method of providing for manufacturing a colored polymer resin having the steps of:

(a) blending a disazo colorant into a mixture of monomers, the colorant having a poly(oxyalkylene) substituent comprising from 2 to 200 alkylene oxide residues, bonded to each end of the disazo chromophore, the poly(oxyalkylene) substituent having a nucleophilic terminal group which is capable of reacting with at least a portion of the monomers;

(b) providing conditions under which the monomers and disazo colorant polymerize to form a colored polymer resin.

9 Claims, No Drawings

PROCESS FOR COLORING POLYMER RESINS AND PRODUCTS THEREOF

This application is a continuation of U.S. patent application Ser. No. 08/733,862, filed on Oct. 18, 1996 now U.S. Pat. No. 5,864,002.

BACKGROUND OF THE INVENTION

This invention relates to a process for coloring polymer resins with a reactive, poly(oxyalkylene) substituted disazo colorant, and in particular to a disazo colorant, which is incorporated into the backbone of a polyurethane resin.

The use of poly(oxyalkylene) substituted colorants in thermosetting resins is well known and may be found in the following references: Cross et al., U.S. Pat. No. 4,284,729; Kluger et al., U.S. Pat. No. 4,507,407; Kluger et al., U.S. Pat. No. 4,751,254; Kluger et al., U.S. Pat. No. 4,761,502; Kluger et al., U.S. Pat. No. 4,775,748; Rekers et al., U.S. Pat. No. 4,846,846; Kluger et al., U.S. Pat. No. 4,912,203 and Machell et al., U.S. Pat. No. 5,231,135.

In a subsequent development, the reactivity of the colorants was enhanced by providing branched poly(oxyalkylene) chains, each with multiple reactive terminal groups. The branching was promoted by incorporating glycidol or chloropropane diol in the poly(oxyalkylene) substituent. Examples of the branched reactive colorants may be found in the following references: Kluger et al., U.S. Pat. No. 5,082,938 and Moody et al., U.S. Pat. No. 5,290,921. While the aforementioned colorants have greater reactivity and thus lower extractability, there are drawbacks associated with their use. Glycidol is a relatively expensive raw material and its use significantly increases the cost of the product. Additionally, in some applications, it is desirable to limit the viscosity of the colorant and the branched poly(oxyalkylene) chains tend to increase the viscosity.

Typically, a product line of reactive colorants for polymer resins will include three to five "primary" colorants, which may be blended to match virtually any desired shade. One prior art primary colorant is a poly(oxyalkylene) substituted, orange monoazo colorant. While the orange colorant provided good color space and shade stability, the intermediates used in synthesis are costly and not readily available.

Poly(oxyalkylene) substituted bisazo colorants have been disclosed for use as fugitive tints in Hines et al., U.S. Pat. No. 5,108,460 and Hauser et al., U.S. Pat. No. 4,113,721. The poly(oxyalkylene) substituent provides water solubility to the colorant. Fugitive tints may be used to temporarily color yarns during textile manufacture as a way to identify fibers and grades, and also to facilitate the repair of broken yarns. The fugitive tint is later washed from the textile prior to dyeing and finishing.

SUMMARY OF THE INVENTION

Therefore, an object of the invention is to provide a process for coloring polymer resins with a poly(oxyalkylene) substituted disazo colorant, which has improved reactivity. Another object is to enhance the reactivity of the colorant without the necessity of expensive epoxides, such as glycidol. Yet another object is to minimize the viscosity of the colorant. Another object is to provide a disazo orange colorant which meets the aforementioned objectives. Still another object of the invention is to provide a colorant for use in polyurethane systems.

Accordingly, a process is provided for coloring polymer resins having the steps of blending a disazo colorant into a mixture of monomers, the colorant has a poly(oxyalkylene) substituent at each end, the substituent comprises from 2 to 200 alkylene oxide residues and has a nucleophilic terminal group which is capable of reacting with a portion of the monomers; and placing the mixture of monomers and colorant under conditions which the monomers and disazo colorant polymerize to form a colored polymer resin. The monomers may constitute one, two or more reactive species, for example a polyol and a polyisocyanate. The disazo colorant may be first dissolved or dispersed with one of the monomer species, prior to a polymerizable mixture of monomers being formed by addition of a second reactive species.

Suitable reaction conditions for the mixture of monomers do not vary significantly by addition of the disazo colorant. Accordingly, those with skill in the art of synthesizing polymers may readily select reaction conditions, such as ratio of reactants (monomers), pH, temperature, pressure, duration, order of addition of reactants, solvents, catalysts and processing aids to promote polymerization, such that the disazo colorant is copolymerized with or grafted to the monomers.

In addition to meeting the aforementioned objectives, the preferred embodiment of the invention includes one or more of the following features and advantages:

the colorant is liquid at ambient conditions;
the colorant is present during polymerization of the resin and is covalently bonded to the polymer;
the colorant is less readily extracted from the polymer resin relative to prior art colorants;
the poly(oxyalkylene) substituents on the disazo colorant are unbranched;
the disazo colorant is not substantially more viscous than prior art colorants, despite having a poly(oxyalkylene) substituent at each end;
the disazo colorant is soluble in at least one of the monomer species forming a polymerizeable mixture of monomers, up to 1 wt %;
the colorant is incorporated into the backbone of the polymer resin;
the colorant is grafted to the polymer resin;
the polymer resin is a polyurethane resin;

DETAILED DESCRIPTION OF THE INVENTION

Without limiting the scope of the invention, the preferred embodiments and features are hereinafter set forth. Unless otherwise indicated, all parts and percentages are by weight and the conditions are ambient, i.e. one atmosphere of pressure and 25° C. The term aromatic compounds mean single and fused double unsaturated hydrocarbon rings as well as unsaturated heterocyclic compounds containing from 1 to 3 hetero atoms selected from S, N and O, which optionally may be benzo-fused. Unless otherwise specified, aliphatic hydrocarbons are from 1 to 12 carbon atoms in length, and cycloaliphatic hydrocarbons comprise from 3 to 8 carbon atoms. The terms and aryl and arylene are intended to be limited to single ring and fused double ring unsaturated hydrocarbons.

All of the United States patents cited in the specification are hereby incorporated by reference.

Colored polymer resins may be made by the process to polymerizing a mixture of monomers which has incorporated into the mixture a reactive, poly(oxyalkylene) substituted disazo colorant.

The disazo colorants of the present invention are characterized by two azo radicals covalently bonded in a straight chain. Each of the azo radicals is covalently bonded to two aromatic groups. The azo radicals may share a bifunctional aromatic group or they may be bonded to separate aromatic groups which are linked together and from the interior of the disazo chain. Opposite the interior of the disazo chain, each of the azo radicals is bonded to an aromatic group, which together are designated the outer aromatic groups.

The disazo colorants include (1) primary disazo colorants, such as symmetrical and unsymmetrical compounds from a tetrazo component, and symmetrical and unsymmetrical compounds with a bifunctional coupling component; (2) secondary disazo colorants, such as compounds made by diazotizing an aminoazo compound, where the amino group is derived from a first coupling component, followed by coupling to a second coupling component; and (3) disazo colorants made by combining separate conjugated azo systems into a single molecule, such as by condensing aminoazo compounds with phosgene, cyanuric chloride or fumaryl dichloride.

When the interior of the disazo colorant is comprised of separate aromatic groups, the aromatic groups may be linked together by a covalent bond or a divalent group. Examples of suitable divalent linking groups include: O, S, $CO_2$, $SO_2$, $C_{1-8}$ alkylene, $C_{2-8}$ alkenylene, carbonyl, triazine, —C(O)CH=CH—C(O)—, phenylene, —C(O)NH— and —NHC(O)NH—. Additionally, divalent linking groups in the disazo colorants of the present invention are exemplified in the "Colour Index", 3rd Edition, Volume 4, C.I. Numbers 20000–29999, pp 4139–4276 (1971).

The disazo colorants further have at least one poly(oxyalkylene) substituent bonded to each end on the colorants, preferably to the outer aromatic groups. The number of poly(oxyalkylene) substituents may vary from 1 to 6 per aromatic group, preferably from 1 to 4.

The poly(oxyalkylene) substituent may be characterized as a straight or branched chain of from 2 to 200 residues of $C_2$–$C_4$ alkylene oxides, predominately ethylene oxide and propylene oxide residues. Minor amounts of glycidol, butylene oxide and other compatible monomers may also be incorporated into the substituent. For example, glycidol monomers may be incorporated into the poly(oxyalkylene) substituent to promote branching. When enhanced branching is desired, preferably from 2 to 10 glycidol units are provided per poly(oxyalkylene) chain. In a preferred embodiment, the poly(oxyalkylene) substituents are primarily comprised of from 2 to 75, most preferably 4 to 35, residues of ethylene oxide, propylene oxide or random and block co polymers thereof.

The poly(oxyalkylene) substituent is provided with a nucleophilic terminal group, which is capable of reacting with the monomers which form the polymeric resin to be colored. Those with skill in the art will recognize that the identity of the group may be varied depending on the monomer employed. For example, in polyol/polyisocyanate systems, the terminal group of the poly(oxyalkylene) substituent may be —OH, —$NH_2$ or SH, preferably —OH.

The poly(oxyalkylene) substituent may be covalently bonded to the disazo colorant by a suitable divalent or trivalent group, for example, N, NR, O, S, $S_2$, $SO_2N$, $SO_2NR$, $CO_2$, CON or CONR, where R is H, $C_1$–$C_2$ alkyl, phenyl or benzyl. Preferably, the linking group is N, NR, O, $SO_2N$ or $SO_2NR$. Two poly(oxyalkylene) substituents may be bonded to the disazo colorant through a trivalent linking group.

The aromatic compounds useful in the invention include phenyl, naphthyl and heterocyclic compounds containing from 1 to 3 hetero atoms selected from S, N and O, which optionally may be benzo-fused. By way of further example, heterocyclic compounds based upon the following structures may be employed: thiazole, benzothiazole, thiadiazole, isothiazole, isoxazole, benzisothiazole, thiene, pyridine, pyrazole, triazole, phthalimide, pyrrole, indole, pyrimidine, thiaphene and furanone. Preferably, all of the aromatic groups comprising the disazo colorant are selected from phenyl, phenylene, naphthyl and naphthalene groups.

In addition to the poly(oxyalkylene) substituent, the aromatic groups of the disazo colorant may be substituted with from 1 to 4 substituent groups, such as $C_1$–$C_4$ alky, $C_1$–$C_4$ alkoxy, halogen, hydroxyl, $SO_3H$, $SO_3Na$, $CO_2R$, CN, $NR_2$, thiole, amide, sulfoxamide, alkyl or aryl carbonyl, halogenated $C_1$–$C_4$ alkyl or aryl, where R is H, $C_1$–$C_8$ alkyl or aryl. Suitable substituent groups are also exemplified in the "Colour Index", 3rd Edition, Volume 4, C.I. Numbers 20000–29999, pp 4139–4276 (1971). When the disazo colorant is employed in coloring polyurethane resin, the presence on the aromatic rings of certain substituents such as $NO_2$, NO, $NH_2$, NHR, where R is alkyl or aryl, SH, OH, $CONH_2$, and $SO_2NH_2$, are preferably not employed to avoid adverse interactions during production of the resin.

Examples of disazo colorants finding utility in the present invention are:

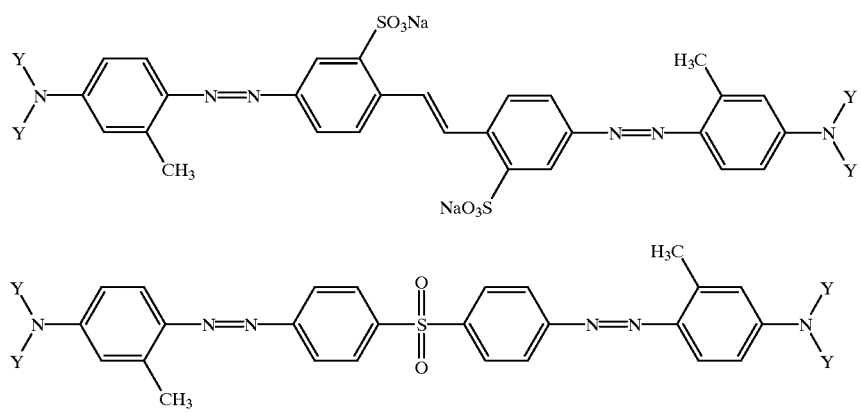

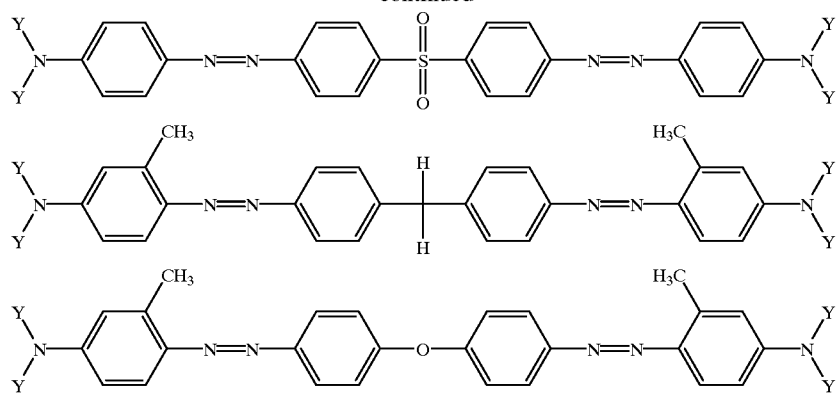

Where Y is a poly(oxyalkylene) substituent and is terminated with a nucleophilic group.

The disazo colorants may be synthesized using procedures well known in the art for synthesizing disazo dyes, except that a poly(oxyalkylene) substituted coupling component or a poly(oxyalkylene) substituted diazo component is employed. Suitable synthesis routes may be found in Hines et al., U.S. Pat. No. 5,108,460, Moody et al., U.S. Pat. No. 5,290,921 and the following examples. The terms "EO" and "PO" refer to ethylene oxide and propylene oxide residues, respectively.

EXAMPLE 1

To a stirring solution of water (250 g), urea (6.1 g), 4,4'-diaminostilbene-2,2'disulfonic acid (22.2 g), and m-toluidine 2EO 10PO 6 EO (132.8 g) was added at room temperature over 15 min. a solution of sodium nitrite (8.8 g) in water (25 g). The reaction mixture was allowed to stir at room temperature overnight. To the ensuing red reaction mixture was added water (250 g) and methylene chloride (100 g). The organic layer was separated. The aqueous reaction mixture was extracted with an additional 100 g of methylene chloride. The organic layers were combined and stripped via rotary evaporator to give the product as a thick red oil with a maximum absorbance (in MeOH) of 513 nm.

EXAMPLE 2

To a stirring solution of water (23.0 g), 93% sulfuric acid (35.0 g), and 2-ethylhexanol (0.2 g) was added at room temperature 4,4'-diaminodiphenylsulfone (10.8 g). The ensuing reaction mixture was stirred for 10 min. then cooled to 0–5° C. Nitrosylsulfuric Acid (40%, 31.0 g) was slowly added while maintaining temperature <10° C. After stirring for 1 h, the mixture was tested for nitrite. A positive nitrite test was obtained and sulfamic acid (1.8 g) was added and a vacuum was pulled. After 1 h, a negative nitrite test was obtained. The ensuing bis diazonium salt solution was then slowly added into a mixture of m-toluidine 2EO 10 PO 6 EO (89.8 g), water (45.0 g), and urea (2.0 g) at 0–10° C. The ensuing red reaction mixture was allowed to stir overnight after which 50% caustic (60 g) was added to adjust the pH to greater than 7. The resulting product layer was separated, washed several times with hot water and stripped via rotary evaporator to give an orange oil with a maximum absorbance (in MeOH) at 471 nm.

EXAMPLE 3

The procedure of example 2 was followed with the exception of amounts of reactions and the particular diamine and coupler employed, all of which are specified below.

| | |
|---|---|
| Sulfuric Acid | 50 grams |
| Water | 50 grams |
| 2-Ethylhexanol | 0.4 grams |
| 4,4'-Diaminodiphenylsulfone | 20 grams |
| Nitrosylsulfuric Acid | 57 grams |
| Sulfamic Acid | 10 grams |
| Aniline 2EO/10PO/6EO | 163 grams |
| Water | 80 grams |
| Caustic | 85 grams |

A yellow/orange oil resulted with a maximum absorbance (in MeOH) at 460 nm.

EXAMPLE 4

The procedure of example 2 was followed with the exception of amounts of reactions and the particular diamine and coupler employed, all of which are specified below.

| | |
|---|---|
| 85% Phosphoric Acid | 21 grams |
| 93% Sulfuric Acid | 19 grams |
| 4,4'-Methylenedianiline | 17 grams |
| 2-ethylhexanol | 0.3 grams |
| Nitrosylsulfuric Acid | 61 grams |
| Sulfamic Acid | 5 grams |
| m-Toluidine 2EO/10PO/6EO | 180 grams |
| Water | 180 grams |
| 50% Caustic | 125 grams |

A yellow orange oil resulted. Lamba Max (MeOH) 426 nm.

EXAMPLE 5

To a stirring solution of water (26.0 g), 93% sulfuric acid (52.0 g), acetic acid (91.5 g), and 2-ethylhexanol (1 g) was added at room temperature 4,4'-oxydianiline (21.0 g). The ensuing reaction mixture was stirred for 10 min. then cooled to 0–10° C. A solution of water (31.0 g) and sodium nitrite (18.0 g) was then slowly added while maintaining temperature <10° C. After stirring for 1 h, the mixture was tested for nitrite. A positive nitrite test was obtained and sulfamic acid (7.5 g) was added and a vacumn was pulled. After 1 h, a negative nitrite test was obtained. The ensuing bis diazonium salt solution was then slowly added into a mixture of m-toluidine 2EO 10 PO 6 EO (217.0 g) and water (150.0 g) at 0–10° C. The ensuing violet reaction mixture was allowed to stir overnight after which 50% caustic (171 g) was added to adjust the pH to greater than 7. The resulting product layer was separated, washed several times with hot water and stripped via rotary evaporator to give an yellow oil with a maximum absorbance (in MeOH) at 428 nm.

Polymer Resins

The disazo colorant may be used to color a wide variety of polymer resins formed by the reaction of an electrophile and a nucleophile, including addition and condensation polymerizations. The nucleophilic groups of the disazo colorant are selected to react with at least a portion of the monomers under polymerization conditions. Examples of suitable resins include polyurethane, polyester, polyamide, epoxy, phenolic, alkyd, allylic, silicone and melamine/urea resins. The colored resins have a range of uses including: soft, semi-rigid and rigid foams; films; fibers; molded parts; coatings; sealants and elastomers.

The disazo colorants are used to color polymer resins by mixing the colorant with the monomers which react to form the polymer, before or during polymerization. In many instances it will be advantageous to pre-mix the colorant and a portion of the monomers, for example, the colorant may be pre-mixed with the polyol prior to the polyol being mixed with a polyisocyanate to make a colored polyurethane. The disazo colorants are preferably liquid. They may be added to a component, or to the reaction mixture in a solvent free form, or diluted with a compatible aqueous or organic solvent.

Because the disazo colorants used in the process are, in themselves, polymeric compounds, they may be soluble, for instance, in most polyols which would be used in polyurethanes, in most epoxy formulations, in polyester formulations and in themselves. This property may be particularly valuable for three reasons. First, this solubility may permit rapid mixing and homogenous distribution throughout the resin, thus eliminating shading differences and streaks when properly mixed. Second, the colorant may have no tendency to settle as would be the case with pigment dispersions. Third, it is possible to prepare a blend of two or more colors which provides a wide range of color availability.

The present invention is particularly advantageous for providing colored polyurethane resins, including thermoplastic and thermosetting resins. The polyaddition reaction of a polyisocyanate and polyol is well known in the art and is discussed in the *ICI Polyurethane's Book*, John Wiley and Sons (1987) and Kirk-Othmer Encyclopedia of Chemical Technology, Third Edition, Volume 23, pp 576–608 (1983). In addition to the polyisocyanate, polyol and disazo colorant, catalysts such as tertiatry amines and organometallic compounds, and minor amounts of surfactants may also be present.

Colored polyurethane resins may be obtained by adding the coloring agent to the polyol or diol component of the reaction mixture, or to one of the other components, although addition to the polyol component is preferred. The polyols may be polyesters, which contain hydroxyl groups, in particular reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols. The coloring agent may also be add-mixed with the so called chain extending diols, for example, ethylene glycol, diethylene glycol, and butane diol. In general, it is desirable not to use more than 20% by weight of disazo colorant based on the weight of polyol.

The next step of the reaction is to mix the polyol and polyisocyanate together. The reactants may be mixed together while being poured into a mold, such as reaction injection molding (RIM).

The disazo colorant is added to the polymerizable mixture of monomers or individual components thereof to achieve a final concentration in the colored polymer resin of from 0.005 to 10 wt. %, preferably 0.1 to 4 wt. %.

The disazo colorants described herin, because of their increased reactivity, have the advantage of reduced extraction levels when incorporated into polyurethane resins. At the same time the disazo colorants show reduced viscosity when compared to similar compounds prepared using chloropropanediol or glycidol based couplers.

EXAMPLE 6A

The following procedure was used. First the color value for the colorants tested was determined by placing about 0.15–0.20 grams of colorant into a 100 mL volumetric flask and adding approximately 40–50 mL of methanol. The flask was swirled until the colorant dissolved in the methanol, after which excess methanol was added to the 100 mL mark on the flask. The flask was stoppered and the contents were mixed and shaken. Exactly 2.0 mL of the solution of the colorant in methanol was then added to a separate 100 mL flask and the flask was filled with methanol to the 100 mL mark, stoppered and shaken.

A Beckman DU-650 Spectrophotometer was zeroed with methanol, filled with the test solution, and the solution was scanned from 300 to 750 mm. The maximum absorbance was recorded. The color value is obtained by multiplying the sample weight by 0.2 and dividing the product obtained into the maximum absorbance value.

In order to correct for varying color strengths, the colorants which were compared were all cut to a consistent color strength with a polyester polyol diluent (Fomrez 11-225™ from Witco). This was accomplished by taking a known amount of colorant with a known color value. The amount of diluent added was determined as follows.

[(Uncut CV/Desired Cut CV)−1](Wgt. of uncut color)=Wgt. of Fomrez™ added

The reactivity of the disazo colorants was tested in a 4 parts per hundred parts (php) polyester formulation with a 0.95 TDI index.

Four grams of an orange disazo colorant adjusted to a color value of 21 and shown in Table 1 below was added to 100 grams of a polyester polyol (Witco 53™, mw~3500) which was mixed with 7.0 mL of a solution which consisted of n-ethylmorpholine (32.5%), water (50.9%), Silicone L-532™ (14.2%), and Baircat B-16™ (2.4%). Next, 34.2 grams toluene diisocyanate (80/20) was allowed to react at ambient conditions for approximately two minutes. The foam was then cured at 130° C. for 15 minutes and 48 hours at room temperature.

After the foams had cured, they were tested for extractability using the following method. One gram of foam was removed from the center of the polyurethane bun. This material was then immersed in 75 mL of ethanol in a glass jar, sealed, and extracted for four hours. The glass jars were shaken every 30 minutes to insure that the foam stayed immersed in the extracting solvent. The amount of color that is extracted from the foam is determined by measuring the absorbance of the extracting solution on a Beckman DU-650 Spectrophotometer. The extraction results are summarized in Table 1 below.

TABLE 1

Disazo Colorant

[Structure: bis(sulfonyl-phenyl-N=N-phenyl(R₁)-NR₂R₃) dimer]

| Run # | R₁ | R₂R₃ | Extraction Absorbance Foam |
|---|---|---|---|
| 6A-1 | CH₃ | 2EO/10PO/6EO | 0.0029 |

EXAMPLE 6B (COMPARITIVE)

The procedure of Example 6A was repeated, except that the disazo colorant of the present invention was replaced by an orange chromophore corresponding to either U.S. Pat. No. 4,284,729 (Run # 6B-1) or U.S. Pat. No. 5,290,521 (Run# 6B-2). The structure of the colorants and results are reported below in Table 2.

TABLE 2

Monoazo Colorant

[Structure: H₃C-S(O)₂-phenyl-N=N-phenyl(H₃C)-NR₄R₅]

| Run # | R₄R₅ | Extraction Absorbance Foam |
|---|---|---|
| 6B-1 | 2EO/10PO/6EO | 0.0823 |
| 6B-2 | 2Gly/10PO/10EO | 0.0313 |

EXAMPLE 7A

Example 6A was repeated except that the yellow disazo colorants shown in Table 3 below were used.

TABLE 3

Disazo Colorant

[Structure: bis(A-phenyl-N=N-phenyl(H₃C)-NR₆R₇) dimer]

| Run # | A | R₆R₇ | Extraction Absorbance Foam |
|---|---|---|---|
| 7A-1 | CH₂ | 2EO/10PO/6EO | 0.0019 |
| 7A-2 | O | 2EO/10PO/6EO | 0.0160 |

EXAMPLE 7B (COMPARATIVE)

Example 6B was repeated, except that the yellow monoazo colorants shown in Table 4 below were used.

TABLE 4

Monoazo Colorant

[Structure: H₃C-O-phenyl-N=N-phenyl(H₃C)-NR₈R₉]

| Run # | R₈R₉ | Extraction Absorbance Foam |
|---|---|---|
| 7B-1 | 2EO/10PO/6EO | 0.1701 |
| 7B-2 | 2Gly/10PO/10EO | 0.0616 |

EXAMPLE 8A

Example 6A was repeated, except that the red disazo colorant shown in Table 5 below was used.

TABLE 5

Disazo Colorant

[Structure: R₁₀R₁₁N-phenyl(CH₃)-N=N-phenyl-CH=CH-phenyl(NaO₃S)-N=N-phenyl(H₃C)-NR₁₀R₁₁ with SO₃Na substituent]

| Run # | R₁₀R₁₁ | Extraction Absorbance Foam C |
|---|---|---|
| 8A-1 | 2EO/10PO/6EO | 0.0015 |

EXAMPLE 8B (COMPARATIVE)

Example 6B was repeated, except that the red monoazo colorants shown in Table 6 below were used.

TABLE 6

Monoazo Colorant

| Run # | $R_{12}R_{13}$ | Extraction Absorbance Foam C |
|---|---|---|
| 8B-1 | 2EO/15PO/5EO | 0.1016 |
| 8B-2 | 2Gly/10PO/10EO | 0.0401 |

The results of Examples 6–8 demonstrate that the disazo colorants of the present invention are more reactive and thus, have significantly lower extraction levels than the comparative monoazo examples. On average, conventional poly (oxyalkylene) substituted colorants with unbranched chains are over 20 times more extractable and colorants with branched chains are over 5 times more extractable, than the disazo colornats having poly(oxyalkylene) substituents at each end of the disazo chromophore.

There are, of course, many alternative modifications and embodiments of the invention which are intended to be included within the scope of the following claims.

What is claimed is:

1. A method of manufacturing a colored polyurethane, comprising the steps of:
   (a) providing a reactive mixture of polyols, polyisocyanates, and a catalyst and further providing a disazo colorant having a poly(oxyalkylene) substituent bonded to each end of the disazo chromophore, each of the poly(oxyalkylene) substituents having from 2 to 200 alkylene oxide residues and a nucleophilic terminal group which is capable of reacting with a polyisocyanate; and
   (b) forming a polyurethane by polymerizing the polyols, polyisocyanates and disazo colorant, whereby the disazo colorant is covalently bonded within the polyurethane.

2. The method of claim 1 wherein each of the poly (oxyalkylene) substituents comprise from 4 to 75 alkylene oxide residues and the terminal group is a hydroxyl group.

3. The method of claim 2 wherein each of the poly (oxyalkylene) substituent is a random or block copolymer of ethylene oxide and propylene oxide.

4. A colored polyurethane obtained by the process comprising the steps of:
   (a) providing a reactive mixture of polyols, polyisocyanates, and a catalyst and further providing a disazo colorant having a poly(oxyalkylene) substituent bonded to each end of the disazo chromophore, each of the poly(oxyalkylene) substituents having from 2 to 200 alkylene oxide residues and a nucleophilic terminal group which is capable of reacting with the polyisocyanates; and
   (b) forming a polyurethane by polymerizing the polyols, polyisocyanates and disazo colorant, whereby the disazo colorant is covalently bonded within the polyurethane.

5. The colored polyurethane of claim 4 wherein each of the poly(oxyalkylene) substituents comprises from 4 to 75 alkylene oxide residues and the terminal group is an hydroxyl group.

6. The colored polyurethane of claim 5 wherein each of the poly(oxyalkylene) substituents is a random or block copolymer of ethylene oxide and propylene oxide.

7. A colored polyurethane comprising a disazo colorant having a poly(oxyalkylene) substituent covalently bonded to each end of the disazo chromophore, each of the poly (oxyalkylene) substituents having from 2 to 200 alkylene oxide residues and a nucleophilic terminal group covalently bonded within the polyurethane.

8. The colored polyurethane of claim 7 wherein each of the poly(oxyalkylene) substituents comprise from 4 to 75 alkylene oxide residues.

9. The colored polyurethane of claim 8 wherein each of the poly(oxyalkylene) substituents is a random or block copolymer of ethylene oxide and propylene oxide.

* * * * *